United States Patent

Wada et al.

[11] Patent Number: 5,955,541
[45] Date of Patent: Sep. 21, 1999

[54] THERMOPLASTIC RESIN COMPOSITION

[75] Inventors: Kazuhito Wada, Akashi; Ikuhiro Mishima, Kakogawa; Shigemi Matsumoto, Akashi, all of Japan

[73] Assignee: Kaneka Corporation, Osaka, Japan

[21] Appl. No.: 08/984,988

[22] Filed: Dec. 4, 1997

[30]  Foreign Application Priority Data

Jan. 17, 1997 [JP] Japan .................................. 9-006753

[51] Int. Cl.$^6$ ...................................................... C08L 51/04
[52] U.S. Cl. ................................. 525/73; 525/78; 525/80; 525/84; 525/85; 525/86; 525/205; 524/504
[58] Field of Search ................................ 525/73, 205, 78, 525/80, 84, 85, 86; 524/504; 523/335

[56] References Cited

U.S. PATENT DOCUMENTS

| | | | |
|---|---|---|---|
| 4,657,976 | 4/1987 | Ott et al. | 525/83 |
| 4,740,553 | 4/1988 | Maeda et al. | 525/67 |
| 4,954,571 | 9/1990 | Iwamoto et al. | 525/205 |
| 5,116,909 | 5/1992 | Mishima et al. | 525/227 |

*Primary Examiner*—Mark L. Warzel
*Attorney, Agent, or Firm*—Kubovcik & Kubovcik

[57]  ABSTRACT

A thermoplastic resin composition which has low rigidity such as bending strength, bending modulus and tensile strength, high impact resistance, and further low stress and large energy absorption at the time of impact, high heat deformation resistance and excellent moldability and comprises 5 to 65 by weight of the copolymer (I) having Tg (glass transition temperature) of not more than 20° C., 20 to 80 parts by weight of the maleimide copolymer (II) and 15 to 75 part by weight of the graft copolymer (III) having a graft ratio of 10 to 70% so that the total amount of the copolymers (I), (II) and (III) becomes 100 parts by weight, can be obtained.

4 Claims, No Drawings

THERMOPLASTIC RESIN COMPOSITION

TECHNICAL FIELD

The present invention relates to a thermoplastic resin composition which is excellent in moldability (surface appearance) (determined by flow mark resistance and pigment dispersibility) and flowability and has low rigidity such as bending strength, bending modulus and tensile strength, high impact strength, low stress at the time of impact, large energy absorption at the time of impact and high heat deformation resistance.

BACKGROUND ART

Styrene resins, particularly ABS resin have been widely used for various miscellaneous goods; interior and exterior materials for automobiles; housings and parts of electric appliances such as a rice cooker, electronic oven and vacuum cleaner; housings and parts of OA apparatuses such as phone and facsimile; and the like since they have excellent rigidity, impact resistance, heat deformation resistance, etc. Recently particularly with respect to interior and exterior materials for automobiles, there have been required characteristics such as dimensional stability at high temperature and moldability (surface appearance) and in addition, flexibility (low rigidity) necessary for enhancing safety at the time of collision as it can be seen in the side collision control according to Federal Motor Vehicle Safety Standard of the U.S.A.

Heretofore various approaches have been made to satisfy requirements for the mentioned characteristics, particularly flexibility (low rigidity) for enhancing safety and moldability (surface appearance) with respect to interior and exterior materials for automobiles. However materials having enough characteristics have not yet been obtained.

For example, JP-A-59-20346 discloses a process in which a specific plasticizer is added to a rubber-reinforced styrene resin. However the process is not satisfactory because heat deformation resistance is low and evaporation of the plasticizer occurs. Though use of a polypropylene resin comprising specific components has been studied, it has defects that surface appearance of a molded article is poor due to a sink mark, dimensional stability is not good due to warping and adhesivity to other material is poor.

With respect to a composition comprising ABS resin and acrylic acid ester copolymer, JP-A-58-179257 discloses that chemical resistance of a composition comprising a rubber-containing styrene resin and acrylic acid ester copolymer having a high gel content is enhanced, and JP-A-63-17954 discloses that chemical resistance of a composition comprising a rubber-containing maleimide-styrene copolymer, ABS resin and acrylic acid ester copolymer is enhanced. However in case of those compositions, surface appearance becomes poor, rigidity is high and stress at the time of impact is high, and thus there has not been obtained a composition having excellent surface appearance, flexibility and impact resistance and low stress and large energy absorption at the time of impact which are aimed at by the present invention.

Further the composition comprising a rubber-containing maleimide-styrene copolymer, ABS resin and acrylic acid ester copolymer, which is disclosed in JP-A-63-17954 has a problem that color shading occurs when a pigment is added thereto.

On the other hand, also with respect to a composition disclosed in JP-A-8-27336, comprising a rubber-containing maleimide-styrene copolymer, ABS resin and acrylic acid ester copolymer and having low stress and large energy absorption at the time of impact and excellent flexibility and impact strength, there have occurred a problem that surface appearance is poor (occurrence of flow mark).

An object of the present invention is to solve the mentioned problems and provide a thermoplastic resin composition having excellent moldability (surface appearance) and flowability; low rigidity such as bending strength and tensile strength; high impact resistance; low stress and large energy absorption at the time of impact; and high heat deformation resistance.

SUMMARY OF THE INVENTION

The present inventors have made intensive studies to attain the above-mentioned object and as a result, have found that a thermoplastic resin composition having excellent moldability (surface appearance) and flowability, low rigidity, high impact resistance, low stress and large energy absorption at the time of impact and high heat deformation resistance can be obtained when the resin composition comprises a specific graft copolymer obtained by grafting a specific monomer mixture to a specific rubber polymer prepared according to a process for enlarging through agglomeration by using a (meth)acrylic acid ester type acid group-containing latex; a specific acrylic acid ester copolymer; and a specific maleimide copolymer.

Namely, the present invention relates to the thermoplastic resin composition (claim 1) comprising 5 to 65 parts (part by weight, hereinafter the same) of an acrylic acid ester copolymer (I) which is prepared by polymerizing 40 to 85% (% by weight, hereinafter the same) of an acrylic acid ester, 15 to 40% of a cyanided vinyl compound, 0 to 45% of an aromatic vinyl compound and 0 to 30% of a monomer copolymerizable therewith (100% in total) and has a glass transition temperature (hereinafter referred to as "Tg") of not more than 20° C. and a gel content of not more than 10%, 20 to 80 parts of a maleimide copolymer (II) which is prepared by polymerizing 10 to 40% of a cyanided vinyl compound, 5 to 50% of a maleimide monomer, 10 to 85% of an aromatic vinyl compound and 0 to 30% of a monomer copolymerizable therewith (100% in total), and 15 to 75 parts by weight of a graft copolymer (III) which comprises a grafted part (B) obtained by grafting a monomer mixture to at least one rubber polymer (A):

said rubber polymer (A) is selected from a diene rubber polymer, olefin rubber polymer and acrylic rubber polymer which have a volume average particle size of 100 to 1,000 nm, said monomer mixture comprises 30 to 85% of a (meth) acrylic acid ester, 0 to 35% of a cyanided vinyl compound, 15 to 35% of an aromatic vinyl compound and 0 to 30% of a monomer copolymerizable therewith, wherein the total percentage being 100%, and said graft copolymer has a graft ratio of 10 to 70%, wherein the total weight of the copolymers (I), (II) and (III) is 100 parts;

the thermoplastic resin composition (claim 2) of claim 1, wherein the rubber polymer (A) is a rubber polymer prepared according to a process for enlarging through agglomeration by using an acid group-containing latex (S) prepared by polymerizing 5 to 50% of at least one of unsaturated acids (c) consisting of acrylic acid, methacrylic acid, itaconic acid and crotonic acid, 50 to 95% of alkyl (meth)acrylate (d) having alkyl of C1 to C12 and 0 to 40% of a monomer copolymerizable with the components (c) and (d), reduced viscosity (30° C., in N,N-dimethylformamide solution) of soluble portion of the acrylic acid ester copolymer (I) and maleimide copolymer (II) in methyl ethyl ketone is from 0.3 to 1.2 dl/g respectively, and a content of the rubber polymer is from 5 to 50% in the thermoplastic resin composition [(I)+(II)+(III)]; and the thermoplastic resin composition (claim 3) of claim 1 or 2, wherein the rubber polymer (A) is a rubber polymer prepared according to a process for enlarging through agglomeration by using an acid group-containing latex (S-1) prepared by polymerizing 5 to 25% of at least one of the unsaturated acids (c) consisting of an acrylic acid, methacrylic acid, itaconic acid and crotonic acid, 5 to 30% of an alkyl acrylate (d-1) having alkyl of C1 to C12, 20 to 80% of an alkyl methacrylate (d-2) having alkyl of C1 to C12, and 0 to 40% of an aromatic vinyl compound, a monomer having at least two polymerizable functional groups in its molecule and/or a cyanided vinyl compound, which are copolymerizable with the components (c), (d-1) and (d-2).

DETAILED DESCRIPTION OF THE INVENTION

The acrylic acid ester copolymer (I) of the present invention is a component used for lowering rigidity and increasing energy absorption at the time of impact, and comprises 40 to 85% of an acrylic acid ester, preferably 50 to 80%, more preferably 55 to 75% from the viewpoint of rigidity; 15 to 40% of a cyanided vinyl compound, preferably 20 to 35%, more preferably 20 to 30% from the viewpoint of impact resistance; 0 to 45% of an aromatic vinyl compound, preferably 0 to 30%, more preferably 0 to 25% from the viewpoint of moldability; and 0 to 30%, preferably 0 to 20%, more preferably 0 to 10% of a monomer copolymerizable therewith (100% in total).

In the acrylic acid ester copolymer (I), when the amount of the acrylic acid ester is less than 40%, rigidity becomes high, impact strength is lowered, stress at the time of impact becomes high and energy absorption at the time of impact is decreased. When more than 85%, heat deformation resistance is lowered and peeling is easy to occur. When the amount of the cyanided vinyl compound is less than 15%, peeling is easy to occur and energy absorption at the time of impact is decreased. When more than 40%, peeling is easy to occur, rigidity becomes high, impact strength is lowered, stress at the time of impact becomes high and energy absorption at the time of impact is decreased. When the amount of the aromatic vinyl compound exceeds 45%, impact strength is lowered and energy absorption at the time of impact is decreased.

Tg of the acrylic acid ester copolymer (I) is not more than 20° C., preferably not more than 0° C., further preferably not more than −10° C. from the viewpoint of rigidity. When Tg exceeds 20° C., rigidity becomes high.

A gel content of the acrylic acid ester copolymer (I) (A 2% solution of methyl ethyl ketone is allowed to stand at 23° C. for 24 hours and filtrated through a 100 mesh metal net. Then a residue on the net is dried and a value obtained by (weight of residue/initial weight)×100 is the gel content) is not more than 10%, preferably not more than 5%, further preferably not more than 3% from the viewpoint of moldability. When the gel content exceeds 10%, moldability is lowered.

A reduced viscosity of the acrylic acid ester copolymer (I) soluble in methyl ethyl ketone (30° C. in N,N-dimethylformamide solution) is preferably from 0.3 to 1.2 dl/g, more preferably from 0.4 to 1.0 dl/g, particularly preferably from 0.45 to 0.9 dl/g. When the reduced viscosity is less than 0.3 dl/g, impact resistance tends to be lowered. When more than 1.2 dl/g, moldability tends to be lowered.

Examples of the acrylic acid ester are, for instance, alkyl acrylates having alkyl of C1 to C18 such as methyl acrylate, ethyl acrylate, butyl acrylate, 2-ethylhexyl acrylate, lauryl acrylate and stearyl acrylate; 2-hydroxyethyl acrylate; glycidyl acrylate; and the like. Among them, butyl acrylate is preferable from an industrial point of view. Those may be used alone or in a mixture of two or more.

Examples of the cyanided vinyl compound are, for instance, acrylonitrile, methacrylonitrile and the like. Among them, acrylonitrile is preferable from an industrial point of view. Those may be used alone or in a mixture of two or more.

Examples of the aromatic vinyl compound are, for an instance, styrene, α-methylstyrene, p-methylstyrene, vinyl naphthalene, chlorostyrene, bromostyrene and the like. Among them, styrene is preferable from industrial point of view. Those may be used alone or in a mixture of two or more.

Examples of the monomer copolymerizable with the acrylic acid ester, etc. are, for instance, acrylic acid, methacrylic acid, maleimide, N-phenylmaleimide and the like.

The maleimide copolymer (II) used in the present invention is a component used for increasing impact resistance and at the same time enhancing flowability. The maleimide copolymer (II) is a copolymer prepared by polymerizing a monomer mixture comprising 10 to 40%, preferably 15 to 35% of the cyanided vinyl compound, 5 to 50%, preferably 10 to 45% of the maleimide monomer, 10 to 85%, preferably 20 to 75% of the aromatic vinyl compound and 0 to 30%, preferably 0 to 20% of the monomer copolymerizable therewith (100% in total).

In the maleimide copolymer (II), when the amount of the cyanided vinyl compound is less than 10%, impact resistance is lowered. When more than 40%, moldability is lowered. When the amount of the maleimide monomer is less than 5%, heat resistance is lowered. When more than 50%, moldability is lowered. When the amount of the aromatic vinyl compound is less than 10%, moldability is lowered. When more than 85%, impact resistance is lowered.

In the maleimide copolymer (II), the content of the aromatic vinyl compound in the monomer mixture is particularly preferably not less than 49% by mole, more preferably not less than 50% by mole, and the upper limit is 80% by mole. When the content is less than 49% by mole, thermal stability, impact resistance and stain resistance of a die tend to be lowered. When more than 80% by mole, impact resistance tends to be lowered.

The reduced viscosity of the maleimide copolymer (II) soluble in methyl ethyl ketone (30° C., in N,N-dimethylformamide solution) is preferably from 0.3 to 1.2 dl/g, more preferably from 0.35 to 1.0 dl/g, particularly preferably from 0.40 to 0.9 dl/g. When the reduced viscosity is less than 0.3 dl/g, impact resistance tends to be lowered. When more than 1.2 dl/g, moldability tends to be lowered.

Examples of the cyanided vinyl compound used for preparing the maleimide copolymer (II) are, for instance, acrylonitrile, methacrylonitrile and the like. Examples of the maleimide monomer are, for instance, maleimide, N-methylmaleimide, N-ethylmaleimide, N-propylmaleimide, N-butylmaleimide, N-phenylmaleimide, N-(p-methylphenyl)maleimide and the like. Examples of the aromatic vinyl compound are, for instance, styrene, α-methylstyrene, p-methylstyrene, p-isopropylstyrene, chlorostyrene, bromostyrene, vinyl naphthalene and the like. Examples of the monomer copolymerizable therewith are, for instance, (meth)acrylic acid, its esters such as methyl (meth)acrylate, ethyl (meth)acrylate, propyl (meth)acrylate, butyl (meth)acrylate, 2-hydroxyethyl (meth)acrylate, 2-ethylhexyl (meth)acrylate, glycidyl (meth)acrylate and the like. From industrial point of view, acrylonitrile is preferable among the cyanided vinyl compounds, N-phenylmaleimide is preferable among the maleimide monomers and styrene is preferable among the aromatic vinyl compounds. Those may be used alone or in combination of two or more thereof.

The graft copolymer (III) used in the present invention is a component used for improving moldability (surface appearance), namely flow mark resistance and pigment dispersibility and enhancing impact resistance. The graft copolymer (III) is particularly important in the composition of the present invention from the viewpoints of flow mark resistance and pigment dispersibility.

The graft copolymer (III) comprises a grafted part (B) obtained by grafting a monomer mixture to at least one rubber polymer (A). The monomer mixture comprises 30 to 85% preferably 30 to 80%, more preferably 35 to 75% of a (meth)acrylic acid ester, 0 to 35%, preferably 5 to 35%, more preferably 10 to 35% of a cyanided vinyl compound, 15 to 35%, preferably 20 to 35%, more preferably 25 to 35% of an aromatic vinyl compound and 0 to 30%, preferably 0 to 20%, more preferably 0 to 15% of a monomer copolymerizable therewith (100% in total). The rubber polymer (A) is selected from a diene rubber polymer, olefin rubber polymer and acrylic rubber polymer which have a volume average particle size of 100 to 1,000 nm, preferably 200 to 900 nm, more preferably 250 to 800 nm. The graft ratio of the graft copolymer (III) is from 10 to 70%, preferably 20 to 60%, more preferably 25 to 55%. As mentioned above, the graft copolymer (III) comprises the grafted part (B) obtained by polymerizing the specific monomer mixture with the specific rubber polymer (A) and has the specific graft ratio. Therefore, compatibility and dispersibility with the acrylic acid ester copolymer (I) and maleimide copolymer (II) become good. In addition, moldability (surface appearance), namely flow mark resistance and pigment dispersibility of the composition of the present invention become good.

When the volume average particle size of the rubber polymer (A) is less than 100 nm, impact resistance tends to be lowered. When more than 1,000 nm, impact resistance is lowered. When the amount of the acrylic acid ester in the monomer mixture constituting the grafted part (B) is less than 30%, flow mark resistance tends to be lowered. When more than 85%, impact resistance tends to be lowered. When the amount of the cyanided vinyl compound is more than 35%, thermal stability, moldability and impact resistance tend to be lowered. When the amount of the aromatic vinyl compound is less than 15%, impact resistance tends to be lowered. When more than 35%, flow mark resistance tends to be lowered. When the graft ratio of the graft copolymer (III) is less than 10%, impact resistance and moldability tend to be lowered. When more than 70%, flowability and moldability tend to be lowered.

As the rubber polymer (A), the diene rubber polymer is preferable from the viewpoint of balance of physical properties (particularly impact resistance), the olefin rubber polymer is preferable from the viewpoints of impact resistance at low temperature and flowability, and the acrylic rubber polymer is preferable from the viewpoint of rigidity (bending strength, tensile strength, etc.).

Examples of the rubber polymer (A) are the diene rubber polymers such as polybutadiene rubber, styrene-butadiene rubber, acrylonitrile-butadiene rubber, butadiene-acrylic acid ester rubber and styrene hydride-butadiene rubber; the olefin rubber polymers such as ethylene-propylene rubber and ethylene-propylene-diene rubber; and the acrylic rubber polymers such as polyacrylic acid ester rubber and ethylene-acrylic acid ester rubber. Those may be used alone or in a mixture of two or more.

Examples of the (meth)acrylic acid ester to be grafted to the rubber polymer (A) are alkyl (meth)acrylates having alkyl of C1 to C18 such as methyl (meth)acrylate, ethyl (meth)acrylate, butyl (meth)acrylate and 2-ethylhexyl (meth)acrylate; 2-hydroxyethyl (meth)acrylate; glycidyl (meth)acrylate; and the like. Examples of the cyanided vinyl compound are acrylonitrile, mathacrylonitrile and the like. Examples of the aromatic vinyl compound are styrene, α-methylstyrene, p-methylstyrene, p-isopropylstyrene, chlorostyrene, bromostyrene, vinyl naphthalene and the like. Examples of the monomer copolymerizable therewith are (meth)acrylic acid, maleimide, N-phenylmaleimide and the like. Among them, from industrial point of view, methyl methacrylate, acrylonitrile and styrene are preferable as the methacrylic acid ester, cyanided vinyl compound and aromatic vinyl compound, respectively. Those monomers may be used alone or in a mixture of two or more.

It is preferable, from the viewpoints of pigment dispersibility, energy absorption at the time of impact and impact strength, that the rubber polymer (A) is a rubber polymer prepared according to a process for enlarging through agglomeration by using the acid group-containing latex (S) obtained by polymerizing 5 to 50% of at least one of unsaturated acids (c) consisting of acrylic acid, mathacrylic acid, itaconic acid and crotonic acid, 50 to 95% of an alkyl (meth)acrylate (d) having alkyl of C1 to C12 and 0 to 40% of a monomer copolymerizable with the components (c) and (d). It is further preferable that the rubber polymer (A) is a rubber polymer prepared according to a process for enlarging through agglomeration by using the acid group-containing latex (S-1) obtained by polymerizing 5 to 25% of at least one of unsaturated acids (c) consisting of acrylic acid, mathacrylic acid, itaconic acid and crotonic acid, 5 to 30% of an alkyl acrylate (d-1) having alkyl of C1 to C12, 20 to 80% of an alkyl methacrylate (d-2) having alkyl of C1 to C12 and 0 to 40% of an aromatic vinyl compound, a monomer having at least two polymerizable functional groups in its molecule and/or a cyanided vinyl compound, which are copolymerizable with the components (c), (d-1) and (d-2).

The particle size and molecular weight of the acid group-containing latex (S) or the acid group-containing latex (S-1) are not particularly limited. The volume average particle size is preferably from 30 to 1,000 nm, more preferably 50 to 500 nm. The reduced viscosity of soluble portion in methyl ethyl ketone (30° C., in N,N-dimethylformamide solution) is preferably from 0.01 to 3.0 dl/g, more preferably 0.02 to 1.0 dl/g.

When the rubber polymer (A) is prepared according to a process for enlarging through agglomeration by using the acid-group containing latex (S) or the acid group-containing latex (S-1), the rubber latex of the diene rubber polymer, olefin rubber polymer or acrylic rubber polymer may be one which is obtained by using any kinds of initiators, chain transfer agents and emulsifying agents when the latex has the components and amounts within the scope of the present invention.

The rubber polymer (A) which is preferable from the viewpoints of pigment dispersibility, energy absorption at the time of impact, impact strength and stability in production can be prepared by adding 0.1 to 15 parts (solid content), preferably 0.5 to 5 parts of the acid group-containing latex (S) or the acid group-containing latex (S-1) on the basis of 100 parts of the rubber latex (solid content) and enlarging through agglomeration.

The unsaturated acid (c) used for preparing the acid group-containing latex (S) or the acid group-containing latex (S-1) is at least one of acrylic acid, methacrylic acid, itaconic acid and crotonic acid. From industrial point of view, acrylic acid and methacrylic acid are preferable.

Among the alkyl (meth)acrylates (d) having alkyl of C1 to C12, as the alkyl acrylate (d-1), there is used an ester of acrylic acid and alcohol having alkyl (which may be linear or branched) of C1 to C12. Examples thereof are methyl acrylate, ethyl acrylate, propyl acrylate, butyl acrylate, 2-ethylhexyl acrylate and the like. Particularly the alkyl acrylates having alkyl of C1 to C8 are preferable from industrial point of view and from the viewpoint of productivity. Those may be used alone or in a mixture of two or more. Among the alkyl (meth)acrylates (d), as the alkyl methacrylate (d-2), there is used an ester of methacrylic acid and alcohol having alkyl (which may be linear or branched) of C1 to C12. Examples thereof are methyl methacrylate, ethyl methacrylate, propyl methacrylate, butyl methacrylate, 2-ethylhexyl methacrylate and the like. Particularly the alkyl methacrylates having alkyl of C1 to C8 are preferable from industrial point of view and from the viewpoint of productivity. Those may be used alone or in a mixture of two or more.

Examples of the aromatic vinyl compound which is the monomer copolymerizable with the above-mentioned monomers are styrene, α-methylstyrene, p-methylstyrene and the like. Examples of the cyanided vinyl compound are acrylonitrile, methacrylonitrile and the like. Examples of the monomer having at least two polymerizable functional groups in its molecule are allyl methacrylate, polyethylene glycol dimethacrylate, triallyl cyanurate, triallyl isocyanurate, triallyl trimellitate and the like. Those may be used alone or in a mixture of two or more.

With respect to the mixing amounts of the rubber polymer (A) and monomer mixture for grafting which are used for preparing the graft copolymer (III), it is preferable, from the viewpoint of easy control of the graft ratio, that the monomer mixture for grafting is from 10 to 500 parts, further 20 to 200 parts on the basis of 100 parts of the rubber polymer (A).

The graft ratio of the obtained graft copolymer (III) is from 10 to 70% as mentioned above. The content of the rubber polymer (A) in the thermoplastic resin composition [(I)+(II)+(III)] of the present invention is from 5 to 50%, preferably from 5 to 40%, particularly preferably from 10 to 30% from the viewpoints of impact resistance, stress and energy absorption at the time of impact and flowability.

Processes for preparing the acrylic acid ester copolymer (I), maleimide copolymer (II) and graft copolymer (III) are not particularly limited as far as the composition within the scope of the present invention can be obtained. Any of the polymerization processes, plymerization initiators, chain transfer agents and surfactants may be used for preparation thereof. For example, as far as the components and amounts thereof are controlled within the scope of the present invention, there may be employed any of known polymerization processes such as bulk polymerization, solution polymerization, suspension polymerization, emulsion polymerization, emulsion-suspension polymerization and emulsion-bulk polymerization. From the viewpoint of easy control of the graft ratio, the emulsion polymerization is preferable.

Examples of the polymerization initiator are known initiators, for instance, a thermal decomposition initiator such as potassium persulfate, rhedox initiator such as Fe-reducing agent-organic peroxide and the like. Examples of the chain transfer agent are t-dodecyl mercaptan, n-dodecyl mercaptan, α-methylstyrene dimer, terpinolene and the like. Examples of the surfactant (emulsifying agent) are emulsifying agents of metal salts of fatty acid such as sodium oleate, sodium palmitate and sodium rhodinate; emulsifying agents of metal sulfonate such as sodium dodecylbenzenesulfonate, sodium alkylsulfonate having 12 to 20 carbon atoms and sodium dioctylsulfosuccinate; and the like.

The thermoplastic resin composition of the present invention is a composition comprising 5 to 65 parts, preferably 10 to 55 parts, more preferably 10 to 45 parts of the acrylic acid ester copolymer (I), 20 to 80 parts, preferably 25 to 70 parts, more preferably 30 to 70 parts of the maleimide copolymer (II) and 15 to 75 parts, preferably 20 to 65 parts, more preferably 20 to 60 parts of the graft copolymer (III) so that the total amount thereof is 100 parts. When the amount of the acrylic acid ester copolymer (I) is less than 5 parts, rigidity becomes high. When more than 65 parts, heat resistance and impact resistance are lowered. When the amount of the maleimide copolymer (II) is less than 20 parts, heat resistance is lowered. When more than 80 parts, rigidity becomes high. When the amount of the graft copolymer (III) is less than 15 parts, impact resistance is lowered. When more than 75 parts, heat resistance and flowability are lowered.

To the composition of the present invention can be optionally added well known anti-oxidant, heat stabilizer, ultraviolet ray absorber, pigment, electrostatic agent and lubricant, if necessary. In order to prepare the composition of the present invention having higher performance as the resin composition for molding, there can be used particularly phenol type, sulfur type, phosphate type and hindered amine type stabilizers used for styrene resins; anti-oxidants; benzophenone type and benzotriazole type ultraviolet ray absorbers and polyorganosiloxane; internal and external lubricants such as aliphatic hydrocarbon, ester of higher fatty acid and higher alcohol, amide or bisamide of higher fatty acid and its modifier and oligoamide and metal salts of higher fatty acid; and the like. Those may be used alone or in a mixture of two or more.

To the composition of the present invention may be further added other styrene resins, for example, acrylonitrile-styrene copolymer, acrylonitrile-styrene-α-methylstyrene copolymer, acrylonitrile-α-methylstyrene copolymer, acrylonitrile-methyl methacrylate-α-methylstyrene copolymer, styrene-maleimide copolymer, styrene-maleic anhydride copolymer and styrene-methyl methacrylate copolymer; polycarbonate resin; polyvinyl chloride resin; polyethylene terephthalate resin; polybutylene terephthalate resin; polyamide resin; and the like in an amount of not more than 50%, preferably not more than 40% on the basis of the sum of the acrylic acid ester copolymer (I), maleimide copolymer (II) and graft copolymer (III) in order to obtain the desired performance of the composition.

The process for preparing the composition of the present invention varies depending on the processes for preparation of the acrylic acid ester copolymer (I), maleimide copolymer (II) and graft copolymer (III). For example, the composition can be prepared by mixing those copolymers in the form of a latex, slurry, solution, powder, pellet, or the like or by mixing them in combination of two or more forms.

In order to obtain a polymer powder from latexes of the polymerized acrylic acid ester copolymer (I), maleimide copolymer (II) and/or graft copolymer (III), there may be employed known methods, for example, a method of adding a salt of alkali earth metal such as calcium chloride, magnesium chloride or magnesium sulfate; a salt of alkali metal such as sodium chloride or sodium sulfate; an iorganic acid such as hydrochloric acid, sulfuric acid or phosphoric acid; or an organic acid such as acetic acid to the latexes for solidification, and then dehydrating and drying. Also spray drying method can be employed.

A part of the stabilizer used can be added in the form of dispersion to the latex or slurry of those resins.

The resin composition of the present invention can be prepared by adding the mentioned stabilizer and, if necessary, the lubricant, pigment, etc. to a powder or pellet comprising one or a mixture of two or more of the acrylic acid ester copolymer (I), maleimide copolymer (II) and graft copolymer (III) and then kneading with a known melt-kneading machine such as Banbury mixer, roll mill, uniaxial extruder or biaxial extruder.

When the composition of the present invention is the composition of claim 1, there can be obtained effects that rigidity is low, impact resistance is high and moldability (surface appearance) is excellent.

When the composition of claim 2 is used instead of the composition of claim 1, further flow mark resistance, pigment dispersibility and impact resistance become good.

When the rubber polymer (A) of claim 3 is used instead of that of claim 1 or 2, energy absorption at the time of impact is further enhanced.

The present invention is explained by means of Examples, but the Examples do not limit the present invention.

Abbreviations used and meanings thereof are as mentioned below.
BA: Butyl acrylate
AN: Acrylonitrile
2EHA: 2-Ethylhexyl acrylate
St: Styrene
PMI: N-Phenylmaleimide
αMSt: α-Methylstyrene
BMA: Butyl methacrylate
MAA: Methacrylic acid
MMA: Methyl methacrylate
tDM: t-Dodecyl mercaptan
CHP: Cumene hydroperoxide Evaluations were carried out according to following methods.
[Tg (Glass Transition Temperature)]
Tg of the copolymer (I) is calculated by a Fox equation by using Tg (referred to in Polymer Handbook) of each homopolymer composing the copolymer.
[Gel Content]
Calcium chloride is added to the latex of the copolymer (I) to solidify the latex. The solidified slurry is heat-treated, dehydrated and dried to give a resin powder which is then added to a methyl ethyl ketone solution to obtain a 2% solution. The solution is allowed to stand at 23° C. for 24 hours and then filtrated through a 100 mesh metal net. The residue on the net is dried and its weight is measured by the following equation.

Gel content (%)=(Weight of residue/initial weight)×100

[Reduced Viscosity]
Calcium chloride is added to the latex of the copolymer (I) or copolymer (II) to solidify the latex. The solidified slurry is heat-treated, dehydrated and dried to give a resin powder which is then added to a N,N-dimethylformamide solution to give a solution having a concentration of 0.3 g/dl. Then a reduced viscosity is measured at 30° C.
[Graft Ratio of Graft Copolymer]
A powder of the graft copolymer (III) is dissolved in methyl ethyl ketone, followed by centrifuging to obtain soluble and insoluble portions in methyl ethyl ketone. The graft ratio is determined by a ratio of those soluble and insoluble portions.
[Volume Average Particle Size of Rubber Polymer]
The volume average particle size of a rubber polymer latex is measured with Nycomp particle size meter available from Pacific Scientific Co., Ltd.
[Conversion at Polymerizing]
The conversion at polymerizing is calculated by using a solid concentration.
[Characteristics of Thermoplastic Resin Composition]
(Izod Impact Strength)
A test piece is produced at a cylinder temperature of 250° C. by using FAS100 B injection molding machine available from Kabushiki Kaisha Fanac. Measurement is made at 23° C. according to ASTM D-256 standard (¼ inch thickness).
(Tensile Strength and Tensile Elongation)
No. 1 dumbbell is produced at a cylinder temperature of 250° C. by using FAS100 B injection molding machine available from Kabushiki Kaisha Fanac. Measurement is made at 23° C. according to ASTM D-638 standard.
(Bending Strength and Bending Modulus)
A test piece is produced at a cylinder temperature of 250° C. by using FAS100B injection molding machine available from Kabushiki Kaisha Fanac. Measurement is made at 23° C. according to ASTM D-790 standard.
(Heat Resistance (HDT))
A test piece is produced at a cylinder temperature of 250° C. by using FAS100B injection molding machine available from Kabushiki Kaisha Fanac. Measurement is made based on heat deformation temperature at a load of 18.6 kg/cm$^2$ according to ASTM D-648 standard.
(Flowability) The flowability is evaluated with a flowing length of a resin in a 3 mm thick spiral die at a cylinder temperature of 250° C. at an injection pressure of 1,350 kg/cm$^2$ by using FAS100B injection molding machine available from Kabushiki Kaisha Fanac.
(Stress and Energy Absorption at the Time of Impact)
A test piece (2 mm thick×100 mm×150 mm plate) is produced at a cylinder temperature of 250° C. by using FAS100 B injection molding machine available from Kabushiki Kaisha Fanac. A 5 kg weight is dropped from a height of 1.5 m at 23° C. to measure load-time variations with a Dynatap impact tester available from General Research Corp. The maximum load is assumed to be a stress at the time of impact, and integrated values of the load-time variations are assumed to be energy absorption (unit: J).

The rigidity and stress at the time of impact are excellent when the values thereof are smaller. The other characteristics are excellent when the values thereof are larger.
(Pigment Dispersibility)
The 2 mm thick×100 mm×150 mm plate produced for determining stress and energy absorption at the time of impact is observed with naked eyes, and the pigment dispersibility is evaluated according to the following criteria.
◯: Color shading is not found.
Δ: Color shading is partly found.

X: Color shading is found throughout the surface.

(Flow Mark Resistance)

No. 1 dumbbell produced for determining tensile strength and tensile elongation is observed with naked eyes, and the flow mark resistance is evaluated according to the following criteria.

∘: Flow mark is not found.

Δ: Flow mark is partly found.

X: Flow mark is found throughout the surface.

Preparation Example 1
(Preparation of Copolymer (I))

① Preparation of copolymer (I-a)

A reactor equipped with a stirrer, reflux condenser, nitrogen introducing port, monomer feeding port and thermometer was charged with 250 parts of deionized water, 1.0 part of sodium dioctylsulfosuccinate, 0.5 part of sodium formaldehyde sulfoxylate, 0.01 part of EDTA and 0.0025 part of ferrous sulfate.

The reactor was heated to 65° C. with stirring under nitrogen stream. After 65° C. was reached, a mixture comprising 74 parts of BA, 26 parts of AN, 0.35 part of tDM and 0.3 part of CHP was added dropwise continuously over seven hours. The sodium dioctylsulfosuccinate was added in an amount of 0.5 part after a lapse of one hour from starting of the polymerization and 0.5 part after a lapse of three hours. After the dropwise addition, the stirring was continued at 65° C. for one hour to complete the polymerization and give a copolymer (I-a).

② Preparation of Copolymer (I-b)

A copolymer (I-b) was prepared in the same manner as in the copolymer (I-a) except that as the monomers, 30 parts of BA, 30 parts of 2EHA, 30 parts of AN, 10 parts of St, 0.35 part of tDM and 0.3 part of CHP were used.

The results are shown in Table 1.

TABLE 1

| Copolymer (I) | I-a | I-b |
|---|---|---|
| Components (part) | | |
| BA | 74 | 30 |
| AN | 26 | 30 |
| 2EHA | — | 30 |
| St | — | 10 |
| tDM | 0.35 | 0.35 |
| CHP | 0.3 | 0.3 |
| Conversion (%) | 99 | 98 |
| Characteristics | | |
| Reduced viscosity (dl/g) | 0.58 | 0.55 |
| Gel content (%) | 0 | 0 |
| Tg (° C.) | −25 | −20 |

Preparation Example 2
(Preparation of Copolymer (II))

① Preparation of copolymer (II-a)

A reactor equipped with a stirrer, reflux condenser, nitrogen introducing port, monomer feeding port and thermometer was charged with 250 parts of deionized water, 1.0 part of sodium dioctylsulfosuccinate, 0.5 part of sodium formaldehyde sulfoxylate, 0.01 part of EDTA and 0.0025 part of ferrous sulfate.

The reactor was heated to 65° C. with stirring under nitrogen stream. After 65° C. was reached, a mixture comprising 15 parts of PMI, 24 parts of AN, 31 parts of St, 30 parts of α MSt (amount of an aromatic vinyl in the monomer mixture was 50% by mole), 0.35 part of tDM and 0.3 part of CHP was added dropwise continuously over seven hours. The sodium dioctylsulfosuccinate was added in an amount of 0.5 part after a lapse of one hour from starting of the polymerization and 0.5 part after a lapse of three hours. After the dropwise addition, the stirring was continued at 65° C. for one hour to complete the polymerization and give a copolymer (II-a).

② Preparation of copolymer (II-b)

A copolymer (II-b) was prepared in the same manner as in the copolymer (II-a) except that as the monomers, 30 parts of PMI, 15 parts of AN, 55 parts of St (amount of St in the monomer mixture was 54% by mole), 0.3 part of tDM and 0.3 part of CHP were used.

The results are shown in Table 2.

TABLE 2

| Copolymer (II) | II-a | II-b |
|---|---|---|
| Components (part) | | |
| PMI | 15 | 30 |
| AN | 24 | 15 |
| St | 31 | 55 |
| αMSt | 30 | — |
| tDM | 0.35 | 0.3 |
| CHP | 0.3 | 0.3 |
| Conversion (%) | 99 | 98 |
| Characteristics | 0.61 | 0.63 |
| Reduced viscosity (dl/g) | | |

Preparation Example 3
(Preparation of Rubber Polymer (A))

① Preparation of rubber polymer (A-1)

As the first stage, a non-enlarged rubber polymer (B) necessary for forming into an enlarged rubber polymer (A-1) was prepared.

A 100-liter polymerizing machine was charged with 230 parts of deionized water, 0.2 part of potassium persulfate and 0.2 part of tDM.

After evacuation of air from the polymerizing machine with a vacuum pump, the polymerizing machine was charged with 0.6 part of sodium oleate, 2 parts of sodium rhodinate and 100 parts of butadiene.

The temperature of the system was elevated to 60° C. to start the polymerization. The polymerization was completed in 25 hours. Conversion was 96%. Volume average particle size of the non-enlarged rubber polymer (B) was 85 nm.

As the second stage, an acid group-containing latex (S) necessary for forming the non-enlarged rubber polymer (B) into the enlarged rubber polymer (A) was prepared in the manner mentioned below.

A reactor equipped with a stirrer, reflux condenser, nitrogen introducing port, monomer feeding port and thermometer was charged with 200 parts of deionized water, 0.6 part of sodium dioctylsulfosuccinate, 0.5 part of sodium formaldehyde sulfoxylate, 0.01 part of sodium ethylenediaminetetraacetate and 0.0025 part of ferrous sulfate.

The reactor was heated to 70° C. with stirring under nitrogen stream. After 70° C. was reached, a monomer mixture comprising 25 parts of BMA, 5 parts of BA, 0.1 part of tDM and 0.15 part of CHP was added dropwise over two hours. Then 50 parts of BMA, 4 parts of BA, 16 parts of MAA, 0.5 part of tDM and 0.15 part of CHP were added dropwise over four hours. After the dropwise addition, the stirring was continued at 70° C. for one hour to complete the polymerization and give an acid group-containing latex (S-1). Volume average particle size of the acid group-containing latex (S-1) was 100 nm.

As the third stage, a rubber polymer (A-1) was prepared by using the non-enlarged rubber polymer (B) and the acid group-containing latex (S-1) which had been previously obtained.

After 3.5 parts (solid content) of the acid group-containing latex (S-1) had been added to 100 parts (solid content) of the latex of the non-enlarged rubber polymer (B) at 60° C., stirring was continued for one hour for enlarging, and thus the rubber polymer (A-1) was prepared. Volume average particle size of the rubber polymer (A-1) was 450 nm.

② Preparation of Rubber Polymer (A-2)

An acid group-containing latex (S-2) was prepared in the same manner as in the acid group-containing latex (S-1) except that the monomer mixture shown in Table 3 was used. Volume average particle size of the acid group-containing latex (S-2) was 95 nm.

A rubber polymer (A-2) was prepared in the same manner as in the rubber polymer (A-1) except that 2.0 parts (solid content) of the acid group-containing latex (S-2) was used. Volume average particle size of the rubber polymer (A-2) was 620 nm.

Table 3 shows components and their amounts of the acid group-containing latexes (S-1) and (S-2) at the time of production thereof.

TABLE 3

| Acid group-containing latex (S) | S-1 | S-2 |
|---|---|---|
| Components (part) | | |
| First stage | | |
| BMA | 25 | 4 |
| BA | 5 | 20 |
| MAA | — | 1 |
| tDM | 0.1 | 0.1 |
| CHP | 0.15 | 0.1 |
| Second stage | | |
| BMA | 50 | 50 |
| BA | 4 | 10 |
| MAA | 16 | 15 |
| tDM | 0.5 | 0.3 |
| CHP | 0.15 | 0.3 |
| Conversion (%) | 99 | 99 |

Preparation Example 4
(Preparation of Graft Copolymer (III), etc,)

① Preparation of graft copolymer (III-a)

A reactor equipped with a stirrer, reflux condenser, nitrogen introducing port, monomer feeding port and thermometer was charged with 280 parts of deionized water, 70 parts (solid content) of the rubber polymer (A-1) (volume average particle size: 450 nm), 0.3 part of sodium formaldehyde sulfoxylate, 0.01 part of EDTA and 0.0025 part of ferrous sulfate.

The reactor was heated to 60° C. with stirring under nitrogen stream. After 60° C. was reached, a mixture comprising 8 parts of AN, 9 parts of St, 13 parts of MMA, and 0.2 part of CHP was added dropwise continuously over five hours. After the dropwise addition, the stirring was continued at 60° C. for two hours to complete the polymerization and give a graft copolymer (III-a).

② Preparation of Graft Copolymer (iii-b)

A graft copolymer (iii-b) was prepared in the same manner as in the graft copolymer (III-a) except that 11 parts of AN, 24 parts of St and 0.2 part of CHP were polymerized with 65 parts (solid content) of the rubber polymer (A-1).

③ Preparation of Graft Copolymer (III-c)

A graft copolymer (III-c) was prepared in the same manner as in the graft copolymer (III-a) except that 10 parts of AN, 10 parts of St, 15 parts of MMA and 0.2 part of CHP were polymerized with 65 parts (solid content) of the rubber polymer (A-2) (volume average particle size: 620 nm).

④ Preparation of Graft Copolymer (iii-d)

A graft copolymer (iii-d) was prepared in the same manner as in the graft copolymer (III-c) except that the non-enlarged rubber polymer (B) (volume average particle size: 85 nm) was used instead of the rubber polymer (A-1).

⑤ Preparation of Graft Copolymer (III-e)

A graft copolymer (III-e) was prepared in the same manner as in the graft copolymer (III-c) except that Nipol LX111NF available from Nippon Zeon Kabushiki Kaisha (polybutadiene, volume average particle size: 350 nm) was used instead of the rubber polymer (A-1).

⑥ Preparation of Graft Copolymer (iii-f)

A graft copolymer (iii-f) was prepared in the same manner as in the graft copolymer (iii-b) except that Nipol LX111NF available from Nippon Zeon Kabushiki Kaisha (polybutadiene, volume average particle size: 350 nm) was used instead of the rubber polymer (A-1).

⑦ Preparation of Graft Copolymer (III-g)

A graft copolymer (III-g) was prepared in the same manner as in the graft copolymer (III-a) except that 10 parts of St, 20 parts of MMA and 0.2 part of CHP were polymerized with 70 parts (solid content) of the rubber polymer (A-1).

The results are shown in Table 4.

TABLE 4

| Graft copolymer (III) | III-a | iii-b | III-c | iii-d | III-e | iii-f | III-g |
|---|---|---|---|---|---|---|---|
| Components (part) | | | | | | | |
| Rubber polymer | | | | | | | |
| Non-enlarged rubber polymer (B) | — | — | — | 65 | — | — | — |
| Rubber polymer (A-1) | 70 | 65 | — | — | — | — | 70 |
| Rubber polymer (A-2) | — | — | 65 | — | — | — | — |
| Nipol LX111NF | — | — | — | — | 65 | 65 | — |
| Particle size of rubber polymer (nm) | 450 | 450 | 620 | 85 | 350 | 350 | 450 |
| AN | 8 | 11 | 10 | 10 | 10 | 11 | — |
| St | 9 | 24 | 10 | 10 | 10 | 24 | 10 |
| MMA | 13 | — | 15 | 15 | 15 | — | 20 |
| CHP | 0.2 | 0.2 | 0.2 | 0.2 | 0.2 | 0.2 | 0.2 |
| Conversion (%) | 98 | 99 | 98 | 98 | 98 | 99 | 99 |
| Characteristics Graft ratio (%) | 35 | 24 | 32 | 41 | 33 | 23 | 34 |

EXAMPLES 1 to 9

Comparative Examples 1 to 7

The latexes of the copolymer (I), maleimide copolymer (II) and graft copolymer (III), which were prepared in Preparation Examples 1, 2 and 4 were mixed in amounts (solid content) shown in Tables 5 and 6, and a phenol type anti-oxidant was added to the mixture, followed by adding calcium chloride for solidifying the mixture. Then the solidified slurry was heat-treated, dehydrated and dried to give a resin composition powder comprising a mixture of the copolymer (I), maleimide copolymer (II) and graft copolymer (III). To the obtained powder was added 1 part of ethylenebisstearamide, followed by blending uniformly with a 20-liter blender available from Kabushiki Kaisha Tabata. Further by melt-kneading the mixture at 240° C. with a 40 m/m uniaxial extruder available from Kabushiki Kaisha Tabata, pellets of a thermoplastic resin composition were prepared and evaluated. The results are shown in Tables 5 and 6.

TABLE 5

| | Ex. No. | | | | | | | | |
|---|---|---|---|---|---|---|---|---|---|
| | 1 | 2 | 3 | 4 | 5 | 6 | 7 | 8 | 9 |
| Components (part) | | | | | | | | | |
| Copolymer (I) | | | | | | | | | |
| I-a | 15 | — | 15 | 15 | 10 | 35 | 35 | 15 | 15 |
| I-b | — | 15 | — | — | — | — | — | — | — |
| Copolymer (II) | | | | | | | | | |
| II-a | 55 | 55 | 55 | — | — | 45 | 30 | 25 | 55 |
| II-b | — | — | — | 55 | 60 | — | — | — | — |
| Graft copolymer (III) | | | | | | | | | |
| III-a | 30 | — | — | 30 | — | 20 | 35 | 60 | — |
| III-c | — | 30 | — | — | 30 | — | — | — | — |
| III-e | — | — | 30 | — | — | — | — | — | — |
| III-g | — | — | — | — | — | — | — | — | 30 |
| Characteristics | | | | | | | | | |
| Stress at the time of impact (KN) | 7.4 | 7.9 | 8.1 | 7.7 | 7.9 | 7.6 | 7.0 | 6.9 | 8.0 |
| Energy absorption at the time of impact (J) | 13.4 | 12.2 | 11.3 | 12.0 | 11.8 | 13.2 | 14.3 | 13.7 | 11.1 |
| Izod impact strength (kgcm/cm) | 39 | 33 | 27 | 30 | 30 | 38 | 41 | 27 | 21 |
| Tensile strength (kg/cm$^2$) | 290 | 310 | 301 | 315 | 320 | 260 | 195 | 194 | 295 |
| Tensile elongation (%) | 38 | 32 | 29 | 35 | 30 | 44 | 39 | 31 | 40 |
| Bending strength (kg/cm$^2$) | 410 | 425 | 422 | 430 | 440 | 380 | 320 | 285 | 415 |
| Bending modulus (kg/cm$^2$) | 14000 | 14300 | 14300 | 14400 | 14500 | 13400 | 11900 | 10400 | 14000 |
| Heat resistance (° C.) | 92 | 93 | 91 | 98 | 100 | 88 | 86 | 80 | 91 |
| Flowability (mm) | 800 | 780 | 750 | 720 | 700 | 900 | 880 | 690 | 810 |
| Pigment dispersibility | ○ | ○ | ○–Δ | ○ | ○ | ○ | ○ | ○ | ○ |
| Flow mark resistance | ○ | ○ | ○ | ○ | ○ | ○ | ○ | ○ | ○ |

TABLE 6

| | Com. Ex. No. | | | | | | |
|---|---|---|---|---|---|---|---|
| | 1 | 2 | 3 | 4 | 5 | 6 | 7 |
| Components (part) | | | | | | | |
| Copolymer (I) I-a | 15 | 15 | 15 | — | 20 | 15 | 70 |
| Copolymer (II) II-a | 55 | 55 | 55 | 60 | — | 85 | 20 |
| Graft copolymer (III) | | | | | | | |
| III-a | — | — | — | — | 80 | — | 10 |
| iii-b | 30 | — | — | — | — | — | — |
| iii-d | — | 30 | — | — | — | — | — |
| III-e | — | — | — | 40 | — | — | — |
| iii-f | — | — | 30 | — | — | — | — |
| Characteristics | | | | | | | |
| Stress at the time of impact (KN) | 7.9 | 8.3 | 8.4 | 10.2 | Not moldable | 10.8 | 11.6 |
| Energy absorption at the time of impact (J) | 12.8 | 6.4 | 12.2 | 5.4 | Not moldable | 2.0 | 2.7 |
| Izod impact strength (kgcm/cm) | 35 | 14 | 24 | 13 | Not moldable | 4 | 5 |
| Tensile strength (kg/cm$^2$) | 291 | 317 | 305 | 512 | Not moldable | 421 | 142 |
| Tensile elongation (%) | 35 | 18 | 25 | 7 | Not moldable | 2 | 5 |
| Bending strength (kg/cm$^2$) | 412 | 435 | 425 | 785 | Not moldable | 556 | 265 |
| Bending modulus (kg/cm$^2$) | 14100 | 14500 | 14400 | 24400 | Not moldable | 19800 | 10100 |

TABLE 6-continued

| | Com. Ex. No. | | | | | | |
|---|---|---|---|---|---|---|---|
| | 1 | 2 | 3 | 4 | 5 | 6 | 7 |
| Heat resistance (° C.) | 92 | 90 | 91 | 109 | Not moldable | 96 | 68 |
| Flowability (mm) | 780 | 790 | 530 | 450 | Not moldable | 810 | 620 |
| Pigment dispersibility | o–Δ | x | Δ–x | o–Δ | Not moldable | o | x |
| Flow mark resistance | x | o | x | o | Not moldable | o | x |

From the results of Tables 5 and 6, it is shown that the thermoplastic resin composition of the present invention which is represented by the compositions of Examples 1 to 9 has particularly low rigidity such as bending strength and tensile strength and high impact resistance, and further has low stress and large energy absorption at the time of impact, high heat deformation resistance and excellent moldability.

Use of the composition of the present invention can give a molded article which has low rigidity, high impact resistance, low stress and large energy absorption at the time of impact, high heat deformation resistance and excellent moldability.

What we claim is:

1. A thermoplastic resin composition which comprises;

5 to 65 parts by weight of an acrylic acid ester copolymer (I) which is prepared by polymerizing 40 to 85% by weight of an acrylic acid ester, 15 to 40% by weight of an acrylonitrile monomer, 0 to 45% by weight of an aromatic vinyl compound and 0 to 30% by weight of a monomer copolymerizable therewith, wherein the total percentage is 100, and has a glass transition temperature of not more than 20° C. and a gel content of not more than 10% by weight, 20 to 80 parts by weight of a maleimide copolymer (II) which is prepared by polymerizing 10 to 40% by weight of an acrylonitrile monomer, 5 to 50% by weight of a maleimide monomer, 10 to 85% by weight of an aromatic vinyl compound and 0 to 30% by weight of a monomer copolymerizable therewith, wherein the total percentage is 100, and 15 to 75 parts by weight of a graft copolymer (III) which comprises a grafted part (B) obtained by grafting a monomer mixture to at least one rubber polymer (A):

said rubber polymer (A) is selected from the group consisting of a diene rubber polymer, olefin rubber polymer and acrylic rubber polymer which have a volume average particle size of 100 to 1,000 nm, said monomer mixture comprises 30 to 85% by weight of a (meth)acrylic acid ester, 0 to 35% by weight of an acrylonitrile monomer, 15 to 35% by weight of an aromatic vinyl compound and 0 to 30% by weight of a monomer copolymerizable therewith, wherein the total percentage is 100%, and said graft copolymer has a graft ratio of 10 to 70% by weight, wherein the total weight of the copolymers (I), (II) and (III) is 100 parts by weight.

2. The thermoplastic resin composition of claim 1, wherein;

said rubber polymer (A) is a rubber polymer prepared according to a process for enlarging through agglomeration by using an acid group-containing latex (S) prepared by polymerizing 5 to 50% by weight of at least one unsaturated acid (c) selected from the group consisting of acrylic acid, methacrylic acid, itaconic acid and crotonic acid, 50 to 95% by weight of an alkyl (meth)acrylate (d) having alkyl of C1 to C12 and 0 to 40% by weight of a monomer copolymerizable with the components (c) and (d), reduced viscosities, measured at 30° C. in N,N-dimethylformamide solution, of soluble portions of the acrylic acid ester copolymer (I) and maleimide copolymer (II) in methyl ethyl ketone are from 0.3 to 1.2 dl/g, respectively, and a content of the rubber polymer (A) in the thermoplastic resin composition is from 5 to 50% by weight.

3. The thermoplastic resin composition of claim 1, wherein the rubber polymer (A) is a rubber polymer prepared according to a process for enlarging through agglomeration by using an acid group-containing latex (S-1) prepared by polymerizing 5 to 25% by weight of at least one unsaturated acid (c) selected from the group consisting of acrylic acid, methacrylic acid, itaconic acid and crotonic acid, 5 to 30% by weight of an alkyl acrylate (d-1) having alkyl of C1 to C12, 20 to 80% by weight of an alkyl methacrylate (d-2) having alkyl of C1 to C12, and 0 to 40% by weight of an aromatic vinyl compound, a monomer having at least two polymerizable functional groups in its molecule and/or an acrylonitrile monomer, which are copolymerizable with the components (c), (d-1) and (d-2).

4. The thermoplastic resin composition of claim 2, wherein the rubber polymer (A) is a rubber polymer prepared according to a process for enlarging through agglomeration by using an acid group-containing latex (S-1) prepared by polymerizing 5 to 25% by weight of at least one unsaturated acid (c) selected from the group consisting of acrylic acid, methacrylic acid, itaconic acid and crotonic acid, 5 to 30% by weight of an alkyl acrylate (d-1) having alkyl of C1 to C12, 20 to 80% by weight of an alkyl methacrylate (d-2) having alkyl of C1 to C12, and 0 to 40% by weight of an aromatic vinyl compound, a monomer having at least two polymerizable functional groups in its molecule and/or an acrylonitrile monomer, which are copolymerizable with the components (c), (d-1) and (d-2).

* * * * *